No. 686,310. Patented Nov. 12, 1901.
H. J. LAWSON.
MOTOR ATTACHMENT FOR ROAD VEHICLES.
(Application filed June 14, 1901.)
(No Model.) 2 Sheets—Sheet 1.

No. 686,310. Patented Nov. 12, 1901.
H. J. LAWSON.
MOTOR ATTACHMENT FOR ROAD VEHICLES.
(Application filed June 14, 1901.)
(No Model.) 2 Sheets—Sheet 2.

Witnesses
Ino R Adams
A. L. McCoy

Inventor
Henry John Lawson.
By Knight Bros
Attorneys

UNITED STATES PATENT OFFICE.

HENRY JOHN LAWSON, OF LONDON, ENGLAND.

MOTOR ATTACHMENT FOR ROAD-VEHICLES.

SPECIFICATION forming part of Letters Patent No. 686,310, dated November 12, 1901.

Application filed June 14, 1901. Serial No. 64,604. (No model.)

*To all whom it may concern:*

Be it known that I, HENRY JOHN LAWSON, a subject of the King of England, residing at London, England, have invented certain new and useful Improvements in or Relating to Motor Attachments for Road-Vehicles, (for which application has been made in Great Britain, No. 23,907, dated December 31, 1900, and in France, Serial No. 295,617, filed January 17, 1901,) of which the following is a specification.

This invention relates to improvements in motor attachments for road-vehicles, and has for its object to provide a motor attachment which may be readily applied to the shafts of a horse-drawn vehicle.

In carrying out this invention as applied, for instance, to a two-wheeled horse-drawn vehicle a driving system of known form may be used comprising a motor with its driving mechanism mounted upon a steering-wheel. The steering-wheel is arranged in front of the vehicle and is provided with a supporting-fork pivoted in a socket rigidly secured to longitudinal side members, which extend rearwardly to the main body of the vehicle. The steering-socket may be secured to the side members by a transverse yoke, and the members are preferably made to take the same line of curvature at their forward ends as the shafts of the vehicle to which they are to be attached, while the rear ends are dropped and secured to the axle of the vehicle. The front ends of the side members are fastened to the shaft of the vehicle by any convenient means, straps being preferably employed, and the rear ends may be turned over to form hooks which engage the axle of the vehicle or may be secured to the same by any means rendering them readily detachable.

Figure 1:
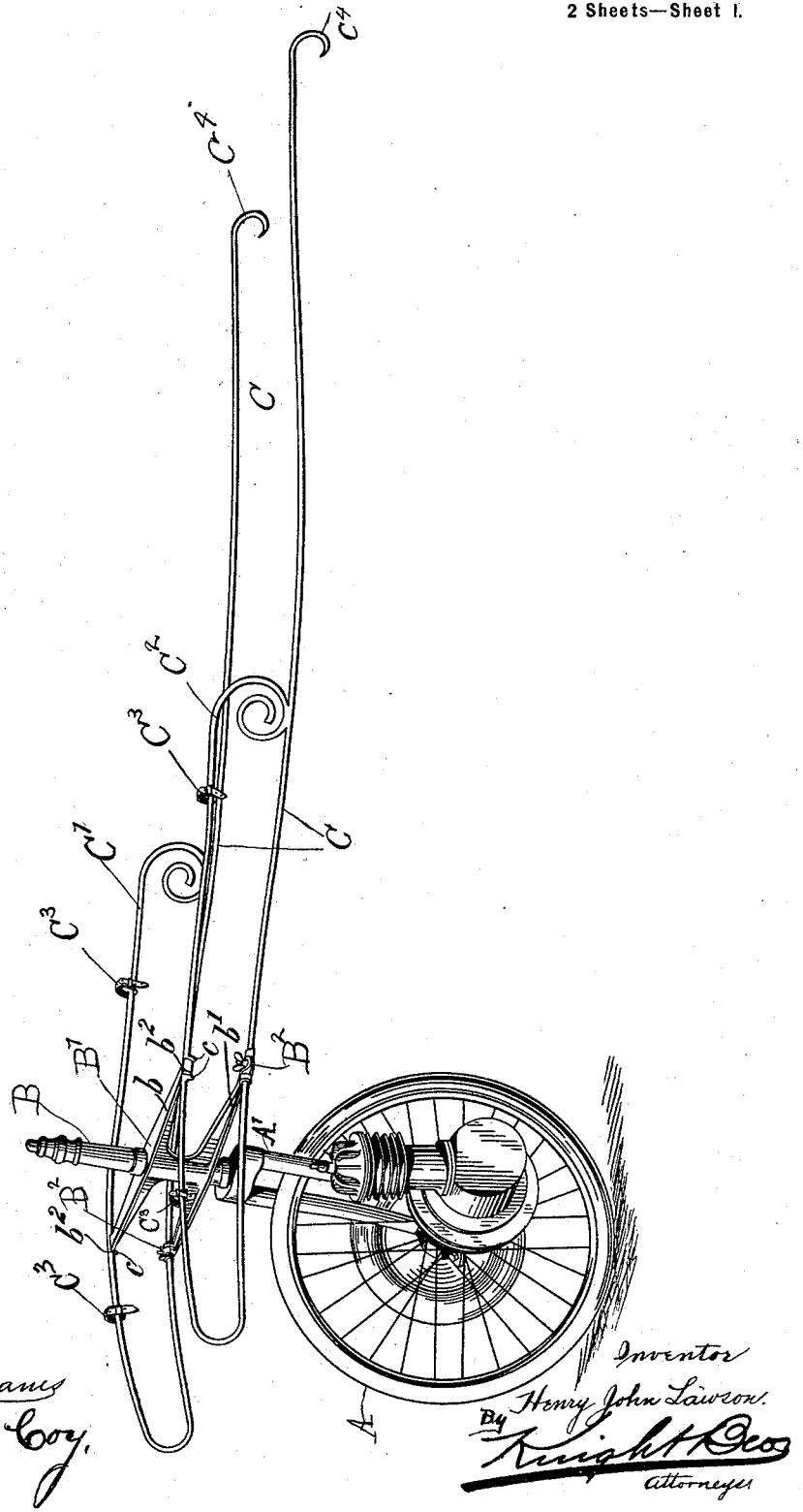
Figure 2:
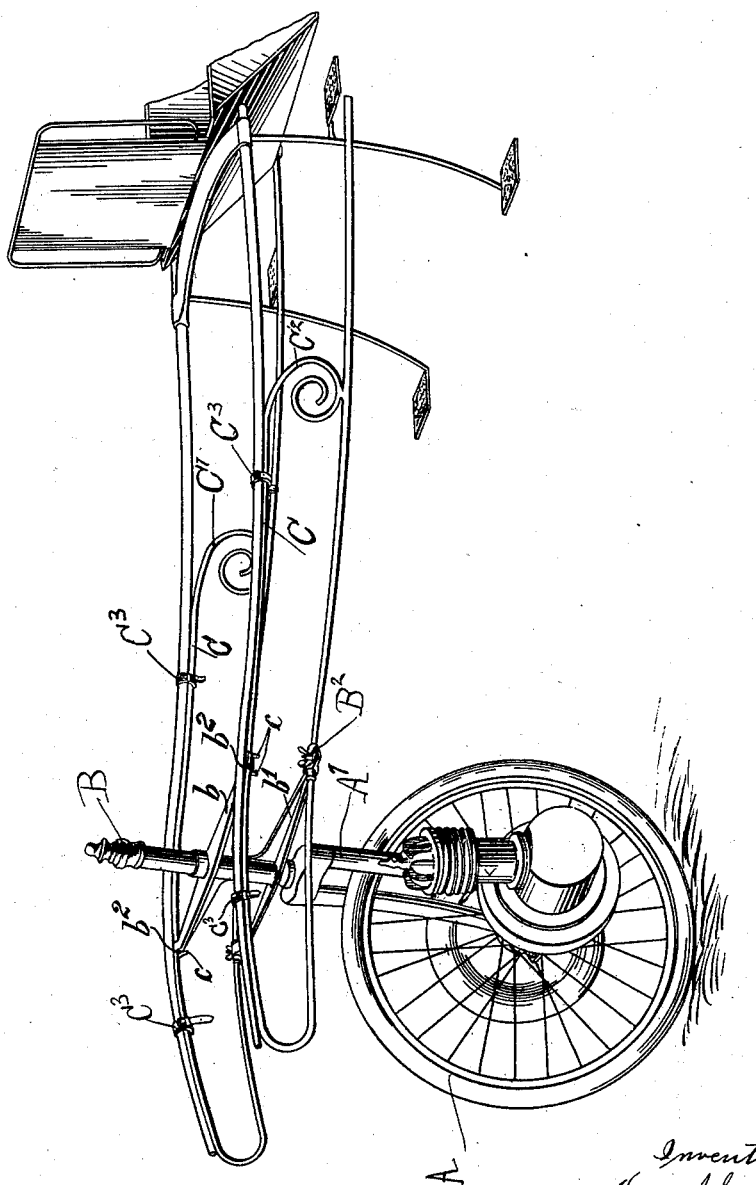

In the accompanying drawings, which illustrate one method of carrying out this invention, Figure 1 is a perspective view of the motor attachment; and Fig. 2 is a perspective view showing the attachment secured to the shafts of a two-wheeled road-vehicle, of which only the fore part is shown.

Like letters indicate like parts throughout the drawings.

The motor driving mechanism A may be of known construction and is secured to a steering-fork A'. The steering-fork is carried in a steering-socket B, having a transverse member or yoke B', conveniently provided with upper and lower arms $b$ $b'$, respectively. To the yoke B' are secured rearwardly-extending side members C—one on each side of the fork. The side members are preferably detachably secured to the yoke B' by any convenient means, such as the clips or gripping devices $B^2$, bolted over the members.

The side members C (shown in the drawings) are doubled back at their forward ends, so that they form upper and lower longitudinal portions C' $C^2$, integral at the forward ends and connected together, if desired, at a point approximately opposite the ends of the portions C'. The longitudinal portions C' are not necessarily secured to the yoke B' by clips, but are conveniently arranged to lie in recesses $b^2$, formed in the upper side of the ends of the arm $b$. Pins or projections $c$ are provided on the members and adapted to engage opposite sides of the arm $b$, so that longitudinal movement of the members relatively to the arm is prevented. The longitudinal portions C' are made to take the same curvature as that of the shafts of the vehicle to which the attachment is to be secured and carry straps $C^3$ or other devices for attaching them to the vehicle. The lower portions $C^2$ of the side members C may take the same form as the upward portions at their forward ends and are extended rearwardly, so that they project beneath the vehicle for attachment to the wheel-axle. The ends of the members C are preferably hooked, as at $C^4$, so that they pass around the far side of the axle and are prevented from being withdrawn from the same by means of the straps $C^3$, though any other convenient device may be used for securing them to the axle of the road-vehicle.

The object of shaping the side members to the shafts of the vehicle to which the motor mechanism is to be attached is to stiffen the shafts, so that they may not rise and fall independently of each other. For this purpose it is of considerable advantage to double the forward ends of the members back upon themselves, as described above, as this enables each member to be secured in two places to the yoke B', thus rendering the connection between the fork which carries the motor mechanism and the shafts of the vehicle much more rigid than would be the case if the yoke were attached at one point only to each longitudinal member. By making the connection between the motor mechanism and the longitudinal members rigid it is obvious that the shafts of the vehicle will be prevented from rising and falling independently of each other and deflecting the fork which carries the motor mechanism out of the vertical line.

It will be understood that although the motor attachment is described as built upon a steering road-wheel, the invention is not restricted to this. The fork may be rigidly secured to the yoke B', if desired, and steering-wheels applied to the vehicle.

Any convenient steering mechanism may be used, whether the motor-wheel or vehicle-wheels are steered.

What I claim as my invention, and desire to secure by Letters Patent, is—

1. In a motor attachment for road-vehicles the combination of a road-wheel, a supporting-fork for the road-wheel, motor driving mechanism secured to the fork and operatively attached to the road-wheel, side rearwardly-extending members, means for securing these side members to the supporting-fork of the road-wheel, means for securing the side members to the shafts of a road-vehicle and means for securing the rear ends of these members to the axle of a road-vehicle, substantially as set forth.

2. In a motor attachment for road-vehicles the combination of a road-wheel, a supporting-fork for the road-wheel, motor driving mechanism secured to the fork and operatively attached to the road-wheel, side rearwardly-extending members, upper longitudinal side members arranged approximately parallel to the road-wheel, means for securing these members to the supporting-fork of the road-wheel, means for securing these members to the shafts of a road-vehicle, lower rearwardly-extending side members, means for securing these members to the supporting-fork of the road-wheel and means for connecting the rear ends of these members to the axle of a road-vehicle substantially as set forth.

3. In a motor attachment for road-vehicles the combination of a road-wheel, a supporting-fork for the road-wheel, motor driving mechanism secured to the fork and operatively attached to the road-wheel, side rearwardly-extending members, upper longitudinal side members formed by the forward ends of the lower members being upwardly and rearwardly curved, means for securing the side members to the supporting-fork of the road-wheel, means for securing the upper longitudinal members to the shafts of a road-vehicle and means for securing the rear ends of the side members to the axle of a road-vehicle, substantially as set forth.

4. In a motor attachment for road-vehicles the combination of a road-wheel, a supporting-fork for the road-wheel, motor driving mechanism secured to the fork and operatively attached to the road-wheel, side rearwardly-extending members, upper longitudinal side members formed by the forward ends of the lower members being upwardly and rearwardly curved, means for securing the free ends of the upper longitudinal members to the lower members, means for securing the side members to the supporting-fork of the road-wheel, means for securing the upper longitudinal members to the shafts of a road-vehicle and means for securing the rear ends of the lower longitudinal members to the axle of a road-vehicle substantially as set forth.

5. In a motor attachment for road-vehicles the combination of a road-wheel, a supporting-fork for the road-wheel, motor driving mechanism secured to the fork and operatively attached to the road-wheel, a yoke secured to the fork above the road-wheel its ends projecting on either side of the wheel, rearwardly-extending side members, means for securing the side members to the ends of the yoke, means for securing the side members to the shafts of a road-vehicle and means for securing the rear ends of the side members to the axle of a road-vehicle substantially as set forth.

6. In a motor attachment for road-vehicles the combination of a road-wheel, a supporting-fork for the road-wheel, motor driving mechanism secured to the fork and operatively attached to the road-wheel, a yoke secured to the fork above the road-wheel, its ends projecting on either side of the wheel, upper and lower arms to the yoke, upper longitudinal side members approximately parallel with the road-wheel, means for securing these members to the ends of the upper arm of the yoke, lower rearwardly-extending side members, means for securing these members to the ends of the lower arm of the yoke, means for securing the upper side members to the shafts of a road-vehicle and means for securing the rear ends of the lower side members to the axle of a road-vehicle, substantially as set forth.

7. In a motor attachment for road-vehicles the combination of a road-wheel, a supporting-fork for the road-wheel, motor driving mechanism secured to the fork and operatively attached to the road-wheel, a yoke secured to the fork above the road-wheel its ends projecting on either side of the wheel, upper and lower arms to the yoke, rearwardly-extending side members, means for securing these members to the ends of the lower arm of the yoke, upper longitudinal members formed by the forward ends of the lower members being upwardly and rearwardly curved means for securing these members to the ends of the upper arm of the yoke, means for securing these members to the shafts of a road-vehicle and means for securing the rear ends of the lower members to the axle of a road-vehicle substantially as set forth.

8. In a motor attachment for road-vehicles the combination of a road-wheel a supporting-fork for the road-wheel, motor driving mechanism secured to the fork and operatively attached to the road-wheel, a yoke secured to the fork above the road-wheel its ends projecting on either side of the wheel, upper and lower arms to the yoke, rearwardly-extending side members, means for securing these members to the ends of the lower arm of the yoke, upper longitudinal members formed by the forward ends of the lower members being upwardly and rearwardly curved, means for securing the free ends of these upper members to the lower members, means for securing these members to the ends of the upper arm of the yoke, means for securing these members to the shafts of a road-vehicle and means for securing the rear ends of the lower members to the axle of a road-vehicle substantially as set forth.

9. In a motor attachment for road-vehicles the combination of a road-wheel, a supporting-fork for the road-wheel, motor driving mechanism secured to the fork and operatively attached to the road-wheel, a yoke secured to the fork above the road-wheel its ends projecting on either side of the wheel, upper and lower arms to the yoke, gripping devices on the ends of the lower arm of the yoke, lower rearwardly-extending side members secured to the ends of the lower arm of the yoke by the gripping devices, upper longitudinal members formed by the forward ends of the lower members being upwardly and rearwardly curved, recesses in the upper side of the ends of the upper arm of the yoke to receive these members, projections on the longitudinal members engaging the sides of the arm of the yoke, means for securing the upper longitudinal members to the shafts of a road-vehicle, means for securing the free ends of these members to the lower rearwardly-extending members and hooked ends to the latter members adapted to engage the axle of a road-vehicle substantially as set forth.

In testimony whereof I have signed my name to this specification in the presence of two subscribing witnesses.

HENRY JOHN LAWSON.

Witnesses:
   A. N. HAYWARD,
   G. F. WARREN.